UNITED STATES PATENT OFFICE.

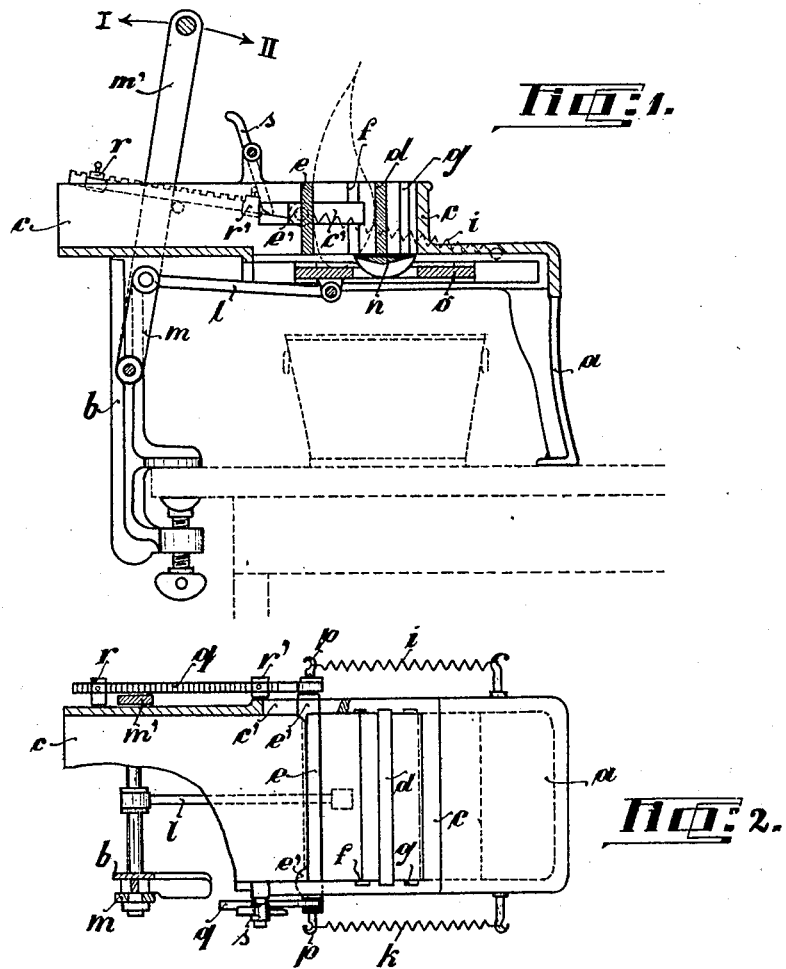

FRANZ WIND, OF LÜBBECKE, GERMANY.

VEGETABLE-CUTTING MACHINE.

No. 910,159.  Specification of Letters Patent.  Patented Jan. 19, 1909.

Application filed August 26, 1907. Serial No. 390,280.

*To all whom it may concern:*

Be it known that I, FRANZ WIND, a subject of the King of Prussia and German Emperor, residing at Lübbecke, in the county of Westphalia, German Empire, have invented certain new and useful Improvements in Vegetable - Cutting Machines, of which the following is a specification.

This invention relates to an improved vegetable cutting machine in which the clamping appliance for the material to be cut is after each cut automatically disengaged while said material is by its own weight advanced for the thickness of the slice to be cut off and fixed again by the clamping appliance for the next cut.

The essence of the invention consists in that the clamping of said material is effected by means of a spring influenced plate to which rods carrying abutments are attached, while for the purpose of liberating said material after each cut, the lever reciprocating the cutting knife strikes, at the end of each stroke, against one of the abutments of said rods thereby effecting the back movement of said plate.

The accompanying drawing shows the improved machine in Figures 1 and 2 in a sectional elevation and plan respectively.

On a suitable stand $a$, $b$ which can be fixed on a table (see dotted lines, Fig. 1) a tray $c$ is mounted in which by the walls $d$, $e$ a closed frame is formed. This frame serves for the reception of the material to be cut, for instance a turnip or the like. One of the walls, $d$, is, to suit the size of the material to be cut, adjustable by being displaced from its holding groove either in the groove $f$ or $g$, while the clamping of said material is effected by the other wall $e$ which is movable on the tray and kept in position by means of the spiral springs $i$, $k$. Below said material the knife holder $o$ with the cutting knife $n$ which has two cutting edges, is moved to and fro by means of a suitable driving mechanism, for instance rod $l$ and levers $m$ the latter being arranged on both sides of the tray and connected by a handle. The spring influenced clamping plate $e$ is guided in slots $c^1$ of the tray $c$ by means of square bolts $e^1$ provided on its faces. Beyond the tray said bolts are round (at $p$, Fig. 2) and engaged by said springs $i$, $k$ and by rods $q$. Said rods carry adjustable abutments $r$, $r^1$ and are so arranged that in one (on the drawing—the left) end position of the knife the upper arms $m^1$ of the levers $m$ strike directly against the abutments $r$ and when farther moved in the direction of the arrow I cause the latter together with the rod $q$ to participate in this movement whereby the clamping plate $e$ is somewhat moved back so that the material to be cut is liberated to fall down under its own weight, *i. e.* to advance for the next cut.

Upon the back movement of the lever arms $m^1$ in the direction of the arrow I I these arms strike against the swivel levers $s$ which acting on the abutments $r^1$ effect then in the same way the disengagement of said material in the other end position of said knife.

Claims.

1. In a vegetable cutting machine having a reciprocating cutter, in combination, a receptacle provided with a spring pressed wall to engage the material to be cut and connections between the reciprocating cutter and said wall designed to cause the latter to withdraw from the material and allow the same to descend by gravity a distance equal to the thickness of a slice at the completion of the cutting stroke.

2. In a vegetable cutting machine having a reciprocating cutter, in combination, a receptacle provided with a spring pressed wall to engage the material to be cut, connections between the reciprocating cutter and said wall designed to cause the latter to withdraw from the material at the completion of the cutting stroke, and a second release for the material at the end of the backward stroke, for the purpose set forth.

In testimony whereof I have hereunto set my hand in the presence of two witnesses.

FRANZ WIND.

Witnesses:
  ROBERT V. BÜLARD,
  MARTA L. THOMPSON.